United States Patent [19]

Murakawa et al.

[11] Patent Number: 4,981,353

[45] Date of Patent: Jan. 1, 1991

[54] POSITION LOCATING APPARATUS FOR AN UNDERWATER MOVING BODY

[75] Inventors: Shinichi Murakawa; Masahiro Fujiwara, both of Takasago; Kiyoshi Tachibana, Kobe; Kyoichi Yoshioka, Kobe; Tomio Aoyama, Kobe, all of Japan

[73] Assignee: Mitsubishi Jukogyo Kabushiki Kaisha, Tokyo, Japan

[21] Appl. No.: 348,642

[22] Filed: May 8, 1989

[30] Foreign Application Priority Data

May 6, 1988 [JP] Japan .............................. 63-59833[U]
Dec. 20, 1988 [JP] Japan ............................ 63-164562[U]

[51] Int. Cl.$^5$ .......................... G01C 3/08; G01C 1/00
[52] U.S. Cl. ......................................... 356/1; 356/4; 356/5; 356/152; 901/47
[58] Field of Search ................... 356/1, 4, 5, 141, 152; 901/17, 47

[56] References Cited

U.S. PATENT DOCUMENTS

3,798,795 3/1974 Michelson ....................... 356/152 X
3,799,676 3/1974 Chatterton .......................... 356/152
4,355,894 10/1982 Maeda ..................................... 356/5

Primary Examiner—Thomas H. Tarcza
Assistant Examiner—Linda J. Wallace
Attorney, Agent, or Firm—Wenderoth, Lind & Ponack

[57] ABSTRACT

An improved position detecting apparatus for detecting the position of an underwater moving body loaded with an inspecting device is provided. The apparatus is such that it makes it possible to perform inspection of a structure in water quickly, reliably and with high precision. The improvements reside in that the apparatus comprises a light source and a corner cube mounted on the underwater moving body in combination to serve as a target, a follower device, which includes a visual sensor for catching light emitted from the light source, for automatically following the target, an underwater argon laser length measuring instrument for measuring a distance between a length measuring head integrated with the visual sensor and the corner cube, and a detector device for detecting the position of the underwater moving body on the basis of an azimuth angle of the target obtained by the follower device, a reference of one side of a triangle and the measured distance.

12 Claims, 5 Drawing Sheets

POSITION LOCATING APPARATUS FOR AN UNDERWATER MOVING BODY

BACKGROUND OF THE INVENTION

1. Field of the Invention

The present invention relates to a position detecting apparatus for detecting the position of an underwater moving body, which is applicable to a supersonic crack detecting system for an atomic reactor vessel (UT machine), and to metering of coordinates of tube header holes of an atomic reactor vessel, metering of center positions of key-slots and metering of sizes for use in a process of building a bridge by omitting temporary assembly.

2. Description of the Prior Art

Figure 7:
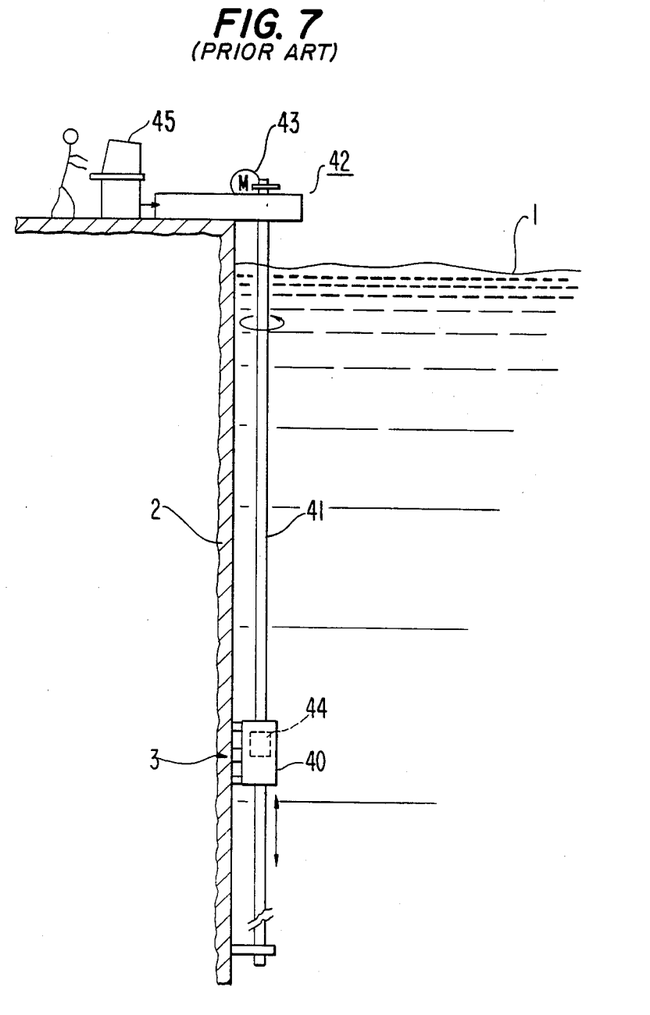
FIG. 7 is a schematic view showing a position detecting apparatus for an underwater moving body in the prior art.

An outline of an apparatus of the above-mentioned type in the prior art is shown in FIG. 7. Supersonic crack detection can be carried out by inspecting a structure 2 (of steel or the like) submerged in water 1 as shown in this figure. This inspection is carried out by a movable truck 40 loaded with a supersonic sensor 3 which is moved up and down by the rotation of a rod 41. The rod 41 is rotationally driven by a drive motor 43 disposed on a position detecting and moving mechanism 42. Inspection data of the structure 2 obtained from the supersonic sensor 3 as a result of movement of this movable truck 40 are sent to a control unit 45 along with position data for the movable truck 40 measured by a position detector section 44 loaded on the movable truck 40. The inspection data is evaluated by comparing it with the position data. It is to be noted the inspection is controlled by the control unit 45. While the illustrated example utilizes only a single rod 41, a plurality of rods 41 can be employed so as to simultaneously carry out various inspections. In addition, different measuring sensors can be mounted on the movable truck 40 in place of the supersonic sensor 3 to perform various measurements other than those for supersonic crack detection.

However, this prior art inspection apparatus is affected by the following problems:

(1) The position detecting and moving mechanism 42 for moving and controlling the movable truck 40 loaded with the supersonic sensor 3 is relatively large, and requires a significant amount of time and labor to prepare it for the inspection.

(2) The precision in detecting the position of the movable truck 40 is poor due to the size of the detecting and moving mechanism 42 and the number of the rods 41.

(3) The movable truck has little freedom of movement during the inspection due to its connection to the rods 41. Therefore it is necessary to change the positions of the rods in order to change the position of the movable truck 40. This results in a poor working efficiency.

SUMMARY OF THE INVENTION

It is therefore one object of the present invention to provide a position detecting apparatus for detecting the position of an underwater moving body, which can quickly and adequately inspect a structure, and can especially inspect with high precision.

According to one feature of the present invention, there is provided a position detecting apparatus for detecting the position of an underwater moving body comprising a light source and a corner cube, in combination, which serve as a target mounted on the underwater moving body. The underwater moving body may include a detecting device and various robots. The apparatus further comprises a follower means for automatically following the target. The follower means includes a visual sensor for catching light emitted from the light source, an argon laser length measuring instrument for measuring a distance between a length measuring head integrated with the visual sensor and the corner cube, and control means for determining the position of the underwater moving body on the basis of a swing angle and a rotational angle of the follower means, a horizontal reference distance (i.e. from the structure being inspected to the follower means) and the measured distance.

According to the present invention, the above-features of the novel position detecting apparatus provide the following effects and advantages. It is unnecessary to use a large-sized position detecting and moving mechanism to measure the position of the movable truck. Consequently, maneuverability is improved, preparation time is shortened, precision in measurement is improved, freedom of maneuverability of the movable truck can be improved, and costs as well as human labor are reduced for inspecting structures and the like.

The above-mentioned and other objects, features and advantages of the present invention will become more apparent by reference to the following description of one preferred embodiment of the present invention taken in conjunction with the accompanying drawings.

BRIEF DESCRIPTION OF THE DRAWINGS

In the accompanying drawings:

FIGS. 1 to 4 jointly illustrate one preferred embodiment of the present invention;

DESCRIPTION OF THE PREFERRED EMBODIMENT

Figure 1:
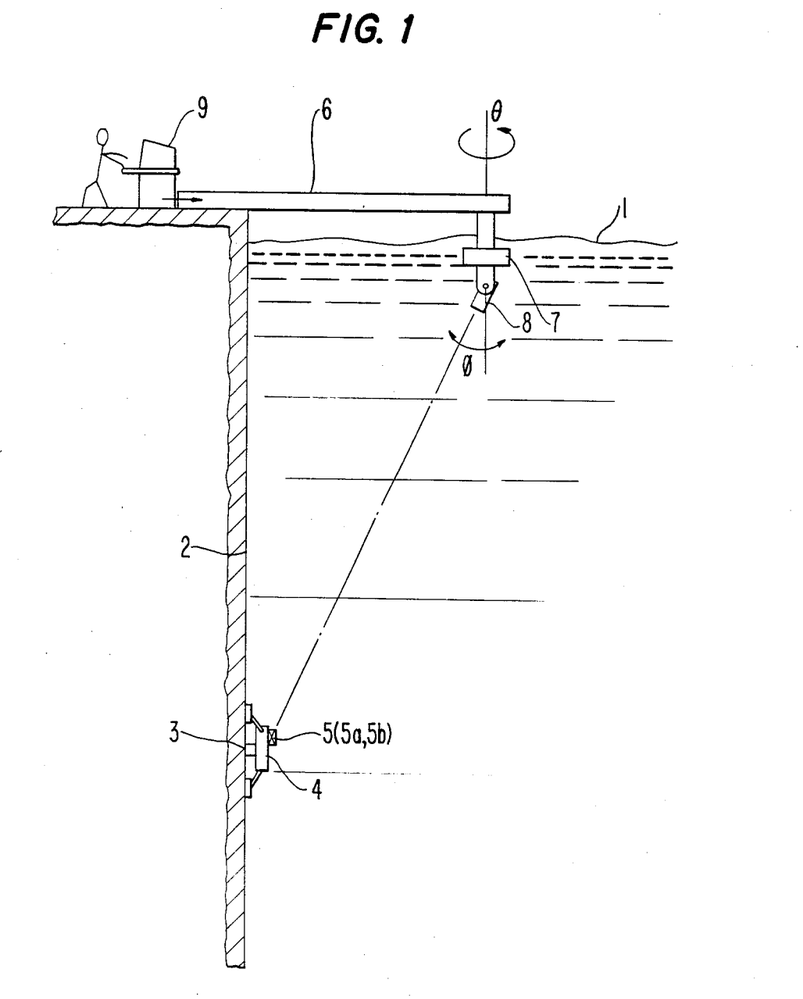
FIG. 1 is a schematic view showing a general construction of a position detecting apparatus for an underwater moving body according to one preferred embodiment of the present invention.

One preferred embodiment of the present invention is illustrated in FIGS. 1 to 4. It is to be noted that component members equivalent to those of the heretofore known apparatus shown in FIG. 7 are given the same reference numerals. A general construction of the position detecting apparatus for an underwater moving body according to the present invention is shown in FIG. 1. A truck target (or target device) 5 consisting of a corner cube 5a, formed of a reflector, and a spherical light source 5b, is loaded on a movable truck 4 having a large amount of freedom of movement, such as a trackless type inspecting truck or an underwater robot, which moves along a wall of a structure 2 in water 1. A follower means is provided and includes position detector section 7 and a sensor head 8. The position detector section 7 for detecting the position of the truck 4 is rotatably mounted about a vertical axis to the bottom of a tip end portion of a frame 6 which is firmly secured to the top of the structure 2. The sensor head 8 is pivotally mounted to the detector section 7 so as to swing along a vertical plane relative thereto such that it can be oriented to face the movable truck 4. Reference numeral 9 designates a control unit for measuring the position of the movable truck 4 on the basis of the rotational angle $\theta$ of the position detector section 7 and the swing angle $\phi$ of the sensor head 8 relative to a vertical axis of the detector section 7.

Figure 2:
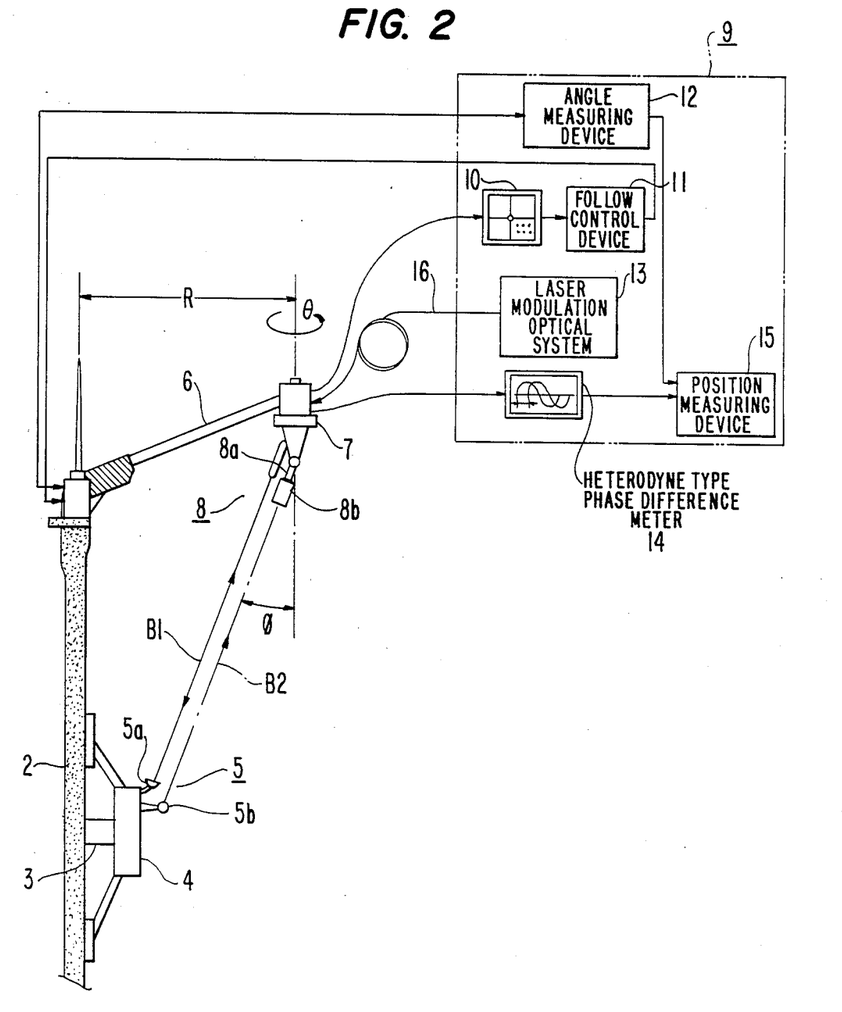
FIG. 2 is a more detailed illustration of principal portions of the same apparatus.

FIG. 2 shows principal portions of the position locating apparatus of FIG. 1 in greater detail. In the sensor head 8 are mounted a length measuring head 8a for emitting a laser beam B1 towards the corner cube 5a on the movable truck 4, and a visual sensor 8b for receiving a spherical light source beam B2 emitted from the spherical light source 5b on the movable truck 4 and producing an image signal. As mentioned above, the corner cube 5a is formed of a reflector such that it reflects the laser beam B1 when it irradiates the corner cube 5a. The above-mentioned laser beam B1 and the spherical light source beam B2 are emitted such that their optical axes are in parallel with each other. The control unit 9 comprises an image processor 10 for measuring and processing (image-processing) a center point of the spherical light source after the spherical light source beam (pattern-recognized as a circle) has been detected by the visual sensor 8b, and a follow control device 11 for measuring and processing a deviation amount and direction of the spherical light source and transmitting a follow control signal to the position detector section 7 and a control section (not shown) of the sensor head 8 in order to cause the visual sensor 8b to follow the spherical light source 5b mounted on the movable truck 4. The control unit 9 further includes an angle measuring device 12 for detecting a head swing angle $\phi$ of the sensor head 8 relative to the position detector section 7, a rotational angle $\theta$ of the position detector section 7 relative to the frame 6, and an azimuth angle of the target device 5 on the basis of a detection signal from the detector section 7. The azimuth angle is simultaneously transmitted to a three-dimensional position measuring device 15 (to be described later) and to the above-described follow control device 11. Furthermore, the control unit 9 includes an argon laser modulation optical system 13 for feeding a laser beam to the length measuring head 8a. (The argon laser has a wavelength of 4880Å and is subjected to intensity modulation at 80 MHz. It is to be noted that the wavelength of 4880Å is a wavelength of light selected because of its minimum attenuation in water, the modulation at 80 MHz is a condition used for distance measurement by light wave, and one modulation wavelength in water becomes about 2.824 m). The control unit 9 also includes a heterodyne type phase difference meter 14 for measuring the distance between the sensor head 8 and the movable truck 4 on the basis of a length signal produced by the length measuring head 8a, and a three-dimensional position measuring device 15 for calculating the position of the movable truck on the basis of the information sent from the above-described angle measuring device 12 and from the phase difference meter 14. Reference numeral 16 designates an optical fiber for transmitting a light signal.

The operation of the illustrated apparatus will now be explained.

The movement of the movable truck 4 can be detected in a non-contact manner by the visual sensor 8b by receiving the spherical light source beam B2 emitted from the spherical light source 5b mounted on the movable truck 4. In addition, on the basis of the information relating to the movement of the movable truck 4, a length measuring axis formed by the laser beam B1 which is parallel to the spherical light source beam B2 can be produced.

A center of gravity (x, y) of the spherical light source 5b is calculated and thereby a deviation amount from the center of the axis is calculated.

$$dx = (1/Nx) \times \sum_{i=1}^{i=Nx} Xi \qquad (1)$$

$$dy = (1/Ny) \times \sum_{i=1}^{i=Ny} Yi$$

In addition, with regard to a control amount, a signal is transmitted to the follow control device 11 so that the deviation amount may be held constant through the following procedure:

$$\pm X = xo - dx$$

$$\pm Y = yo - dy \qquad (2)$$

Thus, the deviation amount is always kept constant. In addition, detection of the position of the movable truck 4 is carried out by detecting the rotational angle $\theta$ of the position detector section 7 and the head swing angle $\phi$ of the sensor head 8 which are transmitted from the angle measuring device 12. Accordingly, the follow control device 11 is controlled so that the position detector section 7 always follows the truck target 5.

In order to measure the distance between the truck target 5 and the sensor head 8, length measuring information is provided by the laser beam B1 to the argon laser modulation optical system 13 by employing, for instance, the argon laser which has a minimum attenuation in water, thus a light signal (the laser beam B1) is transmitted from the length measuring head 8a via the optical fiber 16 (which is a single mode optical fiber), and thereby a length is measured between the length measuring head 8a and the corner cube 5a.

Figure 4A:
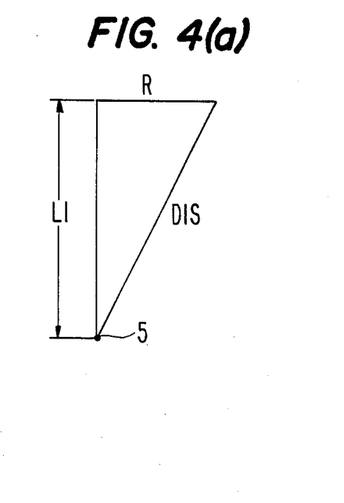
FIG. 4(a) is a schematic illustration showing an angle to be used in a calculation for determining the position of the truck.
Figure 4B:
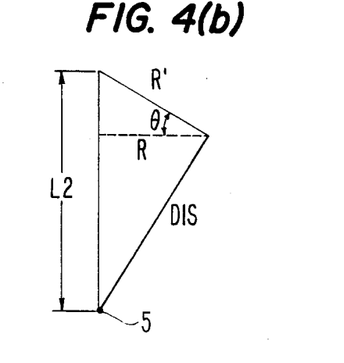
FIG. 4(b) is a schematic illustration showing an angle to be used in another calculation for determining the position of the truck.

The length to be measured is a distance DIS along the laser beam B1, and in order to measure this distance, the argon laser beam B1 emitted from the length measuring head 8a is reflected by the corner cube 5a, the length measuring head 8a receives this reflected laser beam, and after this received laser beam has been subjected to opto-electrical transformation, the electric output signal is transmitted to the phase difference meter 14. Then, in the phase difference meter 14, the phase difference between the laser beam B1 emitted towards the corner cube 5a and the laser beam reflected by the corner cube 5a, is measured. As will be apparent from FIG. 4, the distance DIS between the truck target 5 and the sensor head 8 is calculated on the basis of the following equations. It is to be noted that the length measurement information is illustrated for one modulation cycle, by way of example, assuming a modulation frequency f of 80 MHz.

$$DIS = N \times [C/(2 \times f \times \eta)]$$
$$+ [C \times P/(2 \times f \times \eta \times 360)] \quad (3)$$

where DIS represents a measured distance (m), C represents a light velocity ($3 \times 10^8$(m/x)), f represents the modulation frequency (Hz), $\eta$ represents a refractory index for a medium (1.333 for water), N represents the number of repeated cycles (integer), P represents a measured phase (degrees), and one modulation wavelength is about 2.824 m.

It is to be noted that while the head swing angle $\phi$ is measured, as the depth of the movable truck 4 in the water increases the precision for the angle $\phi$ is degraded. This is because the spherical light source 5b is observed by the visual sensor 8b at a position somewhat deviated from its correct position due to refraction of light. Therefore, in practice, the distance DIS is calculated from the measured angle $\phi$ and the distance R in the horizontal direction of the position detector section 7 from the structure 2. From this calculated distance value DIS it is determined how many cycles the modulation phase has varied, and thus the number of repeated cycles N is determined. Even though the precision for the measurement of the angle $\phi$ is somewhat poor, a good evaluation of the number of repeated cycles N can be achieved. The correct distance DIS can be calculated by adding the distance calculated by using the number of repeated cycles N, in the equation $$N \times \left( \frac{C}{2f \times \eta} \right),$$

to the distance calculated by using the phase $$\left( \frac{C}{2f \times \eta} \times \frac{P}{360} \right).$$

This is the above-described Equation-(3).

In the three-dimensional position measuring device 15, position detection for the movable truck 4 is carried out on the basis of the rotational angle $\theta$ of the position locating detector section 7 and the head swing angle $\phi$ of the sensor head 8, transmitted from the angle measuring device 12, and the distance information DIS transmitted from the phase difference meter 14.

Figure 3:
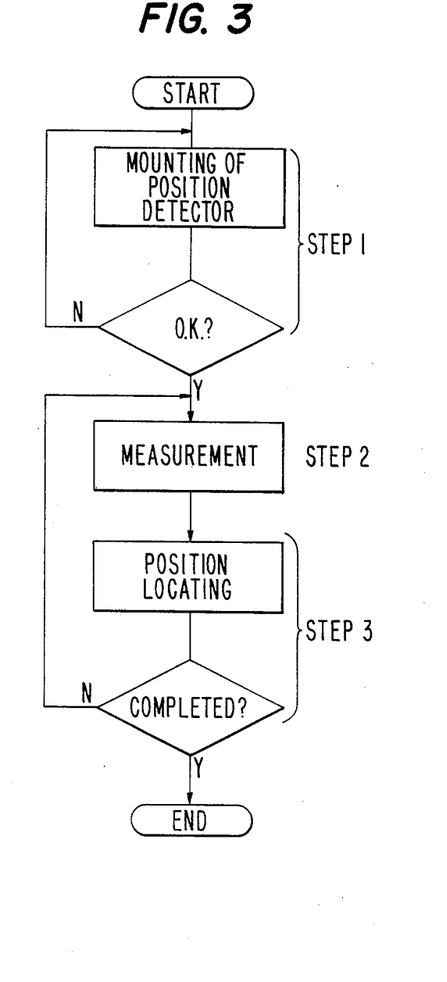
FIG. 3 is a flow chart showing a procedure for calculating a position of a truck.

The process of detecting the position of the movable truck will now be described with reference to FIGS. 3 and 4:

Step 1

The position detector section 7 and the frame 6 are set in position and the horizontal distance R between the position detector section 7 and the structure 2 is measured.

Step 2

The rotational angle $\theta$ of the detector section 7 and the head swing angle $\phi$ of the sensor head 8 are measured and the distance DIS between the sensor head 8 and the truck target 5 is calculated.

Step 3

The position of the movable truck 4 is determined on the basis of the distance DIS, the rotational angle $\theta$ and the head swing angle $\phi$.

When the rotational angle $\theta$ is zero, a distance L1 of the truck target 5, as shown in FIG. 4(a), is calculated by the following formula:

$$L1 = DIS \times \text{Sin} [\text{Cos}^{-1}(R/DIS)] \quad (4)$$

When the rotational angle $\theta$ is not zero, a distance L2 of the truck target 5, as shown in FIG. 4(b), is calculated by the following formula:

$$R' = R/\text{Cos}\theta$$

$$L2 = DIS \times \text{Sin} [\text{Cos}^{-1}(R'/DIS)] \quad (5)$$

In other words, the position of the truck target 5 can be detected even when the truck target 5 has moved three-dimensionally with respect to a reference position. As described above, the head swing angle $\phi$ of the sensor head 8 is used for determining the number of repeated cycles N, which is used in the Equation -(3). The head swing angle $\phi$, however, is not directly used in the equation for calculating the position of the movable truck 4. This is a safety measure for preventing measurement errors caused by the fact that the optical paths of the laser beam B1 and the spherical light source beam B2 may bend due to variations of the refractory index of the water caused by variation in the density of the water due to varied temperature distribution of the water. Such bending of the beams B1 and B2 would otherwise prevent accurate measurements from being obtained.

Another example of the corner cube and the light source on the movable truck 4 and the position detector section 7, respectively, which can be used in the above-described embodiment will now be described with reference to FIGS. 5 and 6. In the illustrated apparatus, a target is constructed by mounting a corner cube and a light source on the same axis. Furthermore, a position detector section includes a laser length measuring device and a visual sensor which are mounted so as to make measurements on the same optical axis by employing a half-mirror and a total reflection mirror.

Figure 5A:
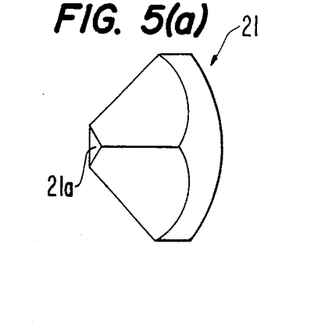
FIGS. 5(a), 5(b), and 6 are schematic representations of a corner cube and a light source on a movable truck and a position detecting section to be used as an alternative to the aforementioned preferred embodiment.

As shown in FIG. 5(a), the corner cube 21 has a back portion formed as a truncated triangular pyramid with a narrow truncated rear end 21a and a wide front end. As shown in FIG. 5(b), light entering through the cut surface 21a can be made to pass to a front surface. Reference numeral 22 designates a condenser lens consisting of, for instance, a ball lens, which focuses light from a light source 23 onto and through the truncated rear end 21a of the corner cube 21 such that the light diffuses at the front and of the corner cube. With this arrangement, light from a light source can be emitted from the corner cube. Therefore, a light source and a corner cube which were provided individually in the first embodiment, can be formed as an integral structure.

Figure 6:
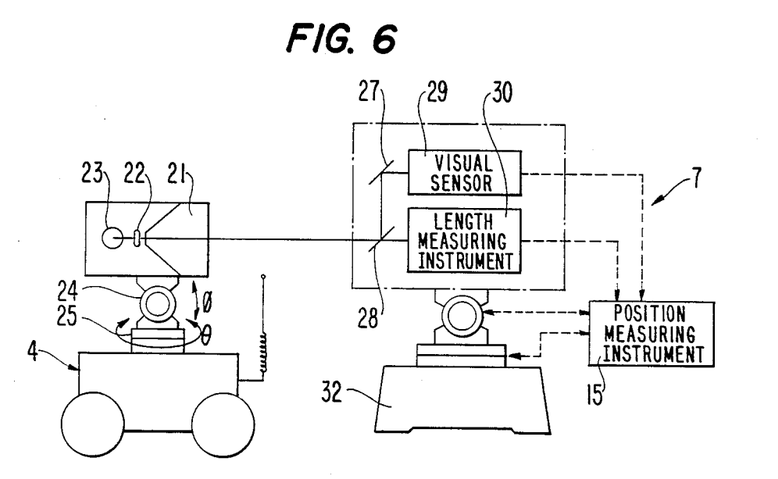

A construction of the position detector section 7 is shown in FIG. 6. In this figure, reference numeral 28 designates a half mirror (partial reflection mirror) which distributes the light beam from the light source 23 and a returning laser beam from a laser length measuring instrument 30 to a visual sensor 29 and the laser length measuring instrument 30, the light beam from the light source 23 and the returning laser beam being coaxial. Reference numeral 27 designates a total reflection mirror which leads the light beam distributed by the half mirror 28 to the visual sensor 29. The use of these mirrors (the half mirror and the total reflection mirror) has made it possible to dispose the visual sensor 29 and the laser length measuring instrument 30 in juxtaposition. By making the two optical beams coaxial by employing the above-mentioned construction, it is possible to make the visual sensor 29 and the laser length measuring instrument 30 operate with great precision.

In FIG. 6, reference numeral 24 designates a $\phi$-direction drive unit, numeral 25 designates a $\theta$-direction drive unit, and numeral 32 designates a fixed table (frame). The values of the angles $\phi$ and $\theta$ detected by the visual sensor 29 and the value of the distance DIS detected by the laser length measuring instrument 30 are fed to the position measuring device 14, where the position of the movable truck 4 is calculated on the basis of the above-described formulae.

As will be apparent from the above description, the present invention makes it possible to detect the position of the movable truck 4 in a non-contact manner, even when the movable truck moves in three dimensions, without the need for a large-sized movable position detecting mechanism. Therefore, maneuverability of the apparatus is improved, preparation time is shortened, precision in measurement is enhanced, freedom of movement of the movable truck is greatly improved, a robot-like device is realized, and the cost and amount of human labor for inspection of a structure is reduced.

Figure 5B:
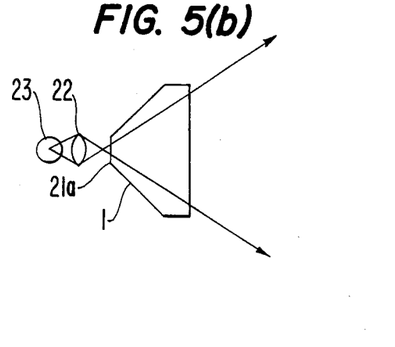

Furthermore, if the devices shown in FIGS. 5 and 6 are used, since the apparatus is constructed in such manner that measurement can be performed with the light source, the corner cube, the laser length measuring instrument and the visual sensor all placed on the same axis, even if the target moves, the laser beam emitted from the laser length measuring instrument would hardly deviate from the corner cube. Thus, attitude control for the target section of the movable truck is easy, and it is unnecessary to employ a highly precise mechanism in the drive system for controlling the attitude. In addition, since the light source and the corner cube are constructed as an integral structure, the target section of the movable truck can be relatively small.

While a principle of the present invention has been described above in connection with one preferred embodiment of the present invention, it is a matter of course that many apparently widely different embodiments of the present invention can be made without departing from the spirit of the present invention.

What is claimed is:

1. A position detecting apparatus for detecting a position of an underwater movable body which is adapted to move along a structure and is provided with an inspection device, comprising:

a target device mounted on the movable body and including a corner cube having means for reflecting a laser beam, and a light source means for emitting a light beam;

follower means, angularly rotatable about a vertical axis and including a sensor head angularly swingable relative to said vertical axis, for automatically following said target device, said sensor head including an argon laser length measuring means, having a length measuring head separated from said target device by a horizontal reference distance, for emitting a laser beam to said corner cube, receiving said laser beam when reflected by said corner cube and producing a length signal based thereon, and a visual sensor means for receiving said light beam emitted by said light source means; and control means for receiving said length signal, for measuring a rotational angle of said follower means and a swing angle of said sensor head, and for determining the position of the movable body on the basis of said swing angle, said rotational angle, said length signal and said horizontal reference distance.

2. A position detecting apparatus as recited in claim 1, wherein said control means comprises an argon laser modulation optical system and a phase difference meter.

3. A position detecting apparatus as recited in claim 1, further comprising a frame adapted to be mounted to the structure along which the underwater movable body is adapted to move, said follower means being mounted to said frame.

4. A position detecting apparatus as recited in claim 1, wherein said light source means, said corner cube, said visual sensor means and said length measuring head are mounted, respectively, in a manner such that a line between said length measuring head and said corner cube is parallel to a line between said light source means and said visual sensor means.

5. A position detecting apparatus as recited in claim 1, wherein said control means comprises an argon laser modulation optical system connected to said length measuring head by an optical fiber.

6. A position detecting apparatus as recited in claim 1, wherein said argon laser length measuring means further comprises means for producing an argon laser beam modulated at 80 MHz.

7. A position detecting apparatus as recited in claim 1, wherein said corner cube has a back portion shaped as a truncated triangular pyramid with a narrow truncated rear end and a wide front end, said light source means is mounted rearwardly of said corner cube, and a lens means is mounted between said light source means and said corner cube for causing light emitted from said light source means to pass through said truncated rear end.

8. A position detecting apparatus as recited in claim 7, wherein said light source means, said lens means and said corner cube are mounted so as to form an integrated structure.

9. A position detecting apparatus as recited in claim 8, wherein said length measuring means is operable to emit a laser beam;

said corner cube includes means for reflecting said laser beam back to said length measuring means; and said length measuring means is further operable to receive said laser beam after it is reflected by said reflecting means of said corner cube.

10. A position detecting apparatus as recited in claim 9, wherein said follower means further comprises means for making said light beam emitted from said light source colinear with said laser beam.

11. A position detecting apparatus as recited in claim 10, wherein said means for making said light beam colinear with said laser beam comprises a partial reflection mirror and a full reflection mirror.

12. A position detecting apparatus as recited in claim 1, wherein said visual sensor means is operable to produce an image signal; and said control means comprises an image processor means for processing said image signal, and a follow control means for producing a control signal to cause said follower means to follow said light source means of said target device.

* * * * *